United States Patent
Duits et al.

(10) Patent No.: US 6,705,761 B1
(45) Date of Patent: Mar. 16, 2004

(54) BEARING WITH INTEGRAL TRANSFORMER

(75) Inventors: Johannes Andrianus Duits, Bodegraven (NL); Johannes Albertus Van Winden, Heidelberg (DE); Eduardus Gerardus Maria Holweg, Delft (NL); Anton Paweletz, Fellbach (DE)

(73) Assignee: SKF Engineering and Research Centre, B.V., Nieuwegein (NL)

( * ) Notice: Subject to any disclaimer, the term of this patent is extended or adjusted under 35 U.S.C. 154(b) by 0 days.

(21) Appl. No.: 09/807,224
(22) PCT Filed: Oct. 18, 1999
(86) PCT No.: PCT/NL99/00646
 § 371 (c)(1),
 (2), (4) Date: May 29, 2001
(87) PCT Pub. No.: WO00/23779
 PCT Pub. Date: Apr. 27, 2000

(30) Foreign Application Priority Data

Oct. 16, 1998 (NL) .............................................. 1010340

(51) Int. Cl.$^7$ ............................................... F16C 19/06
(52) U.S. Cl. ..................................... 384/448; 384/446
(58) Field of Search ................................. 384/448, 446, 384/492, 565, 569

(56) References Cited

U.S. PATENT DOCUMENTS 4,688,951 A 8/1987 Guers
5,055,775 A 10/1991 Scherz et al.

FOREIGN PATENT DOCUMENTS

GB 1 237 932 A 7/1971

Primary Examiner—Lenard A. Footland
(74) Attorney, Agent, or Firm—Oliff & Berridge, PLC

(57) ABSTRACT

A bearing is provided including a first part provided with a first coil (4) and a second part rotatable with respect to the first part about a bearing axis and being provided with a second coil which is electromagnetically coupled to the first coil. The first and second coil are magnetically enclosed by a first covering and a second covering, respectively. The first covering is fixed to the first part and the second covering is fixed to the second part. An air gap is formed between facing ends of the first and second coverings, with at least one of the facing ends of the first and second coverings being provided with at least one recession, such that the air gap varies when the first part and second part rotate with respect to each other. This may be used to provide an indication of speed (bearing rotation) without further sensors. Next to contactless transmission of power or data signals, the coupling between the first and second coil vary to provide a signal representative of the relative rotational speed of the first part of the bearing with respect to the second part.

13 Claims, 3 Drawing Sheets

BEARING WITH INTEGRAL TRANSFORMER

BACKGROUND OF THE INVENTION

1. Field of Invention

The present invention relates to a bearing that provides an indication of speed without further sensors.

2. Description of Related Art

A bearing of this type is disclosed in British patent application GB-A-1 237 932. This publication discloses an electrical measurement apparatus using an inductive coupling arrangement between a static core and a rotating part to communicate a measurement signal from the rotating part to the static core.

A disadvantage of the known assembly is that it is only suitable to transmit signals from a rotating part to a stationary part. Often it is desirable to know e.g. the rotational speed of a bearing.

SUMMARY OF THE INVENTION

It is an object of the present invention to provide a bearing for contactless transmission of signals, which also provides an indication of the rotational speed of the bearing without requiring further sensors.

The bearing according to the present invention has the advantage that next to contactless transmission of (power or data) signals, it serves as a sensor for the rotational speed of the bearing, without needing any further sensors. The coupling between the first and second coil varies when the first part of the bearing rotates with respect to the second part, and hence the signal transmitted from the first coil to the second coil varies. Thus, next to transmitting energy and/or data from the first coil to the second coil and vice versa, this embodiment also allows to obtain a signal representing the relative (rotational) speed of the first part of the bearing with respect to the second part.

A further advantage of this bearing is that it is possible to exchange electrical signals with a circuit which is fixed on or to the rotary part of the bearing. It will be clear that the present invention is applicable to all types of bearings, such as sleeve bearings, ball bearings and roller bearings.

It is known to a person skilled in the art to exchange electrical signals with a circuit which is fixed on a rotary shift with the aid of, for example, assemblies of slip rings and contacts. The disadvantage is that the slip rings and the contacts on the rotary shaft are subject to wear and that the electrical connections are less reliable. Moreover, the slip rings give rise to additional friction, which is not always desirable. The slip rings and contacts also take up additional space, which can be disadvantageous in some applications.

With the aid of the bearing according to the present invention it is possible to produce a reliable and friction-free coupling with a circuit fixed on the rotary shaft.

According to a preferred embodiment of the present invention, the axes of the first and of the second coil are coincident with the axis of rotation of the bearing. By this means as great as possible an electromagnetic coupling between the coils is achieved, as a result of which the signal transfer is better and more reliable.

If, in accordance with a further embodiment, the bearing is made of a nonferrous material, the first and/or second coil can be located in a recess in the first or second part, respectively. In a further embodiment, the first and/or second coil can even be completely embedded in the first or second part, respectively. The non-ferrous metal will, after all, not disturb the magnetic field lines.

According to a further embodiment, the first and/or second coil comprise/comprises printed windings. Electronic circuits connected to the first or the second coil, respectively, can also be incorporated on the first and/or second part of the bearing. The windings and/or electronic circuits can, for example, be produced and applied by thin film techniques known to those skilled in the art. By this means an even more compact construction of the bearing according to the present invention is possible.

When the first and second covering are formed by U-shaped circular members, the at least one air gap is preferably formed by at least one recession in one of the U-shaped circular member legs.

In a second aspect, the present invention also relates to an assembly of at least one bearing according to the present invention and a rotary shaft supported by the at least one bearing, characterized in that the assembly is further provided with an electrical circuit fixed on the rotary shaft, which circuit has connections linked to a second coil.

By this means it is possible to produce an electrical coupling from the stationary part of the bearing via the rotary part of the bearing to a circuit fixed on the rotary shaft, and vice versa.

In one embodiment according to the present invention, signals originating from the circuit are fed to the second coil via a signal line.

Using an assembly according to this embodiment it is therefore possible to make signals originating from the circuit, for example measurement signals, available on the stationary part of the bearing via the second coil and first coil. The signals can then simply be passed on to evaluation or control circuits.

In a further embodiment the first coil is connected to an electrical power supply an the second coil is connected to the circuit via a power line.

By this means it is possible to provide the circuit on the rotary shaft with electric power.

It will be clear to a person skilled in the art that multiple bearings according to the present invention can be used in order both to provide the circuit with electrical power and to make the signals from the circuit available on the stationary part of the bearing. It is also conceivable that, for example, the signals originating from the circuit are multiplexed in the circuit in a manner known to those skilled in the art, by which means more than one signal from the circuit can be transmitted to the stationary part of the bearing.

The present invention will now be explained in more detail with reference to a preferred embodiment and the appended drawings, in which:

DETAILED DESCRIPTION OF PREFERRED EMBODIMENTS

Figure 1:
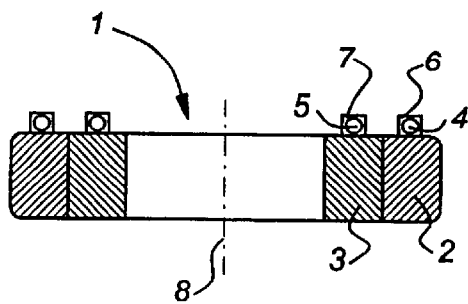
FIG. 1 shows a cross-sectional view of a bearing with an integral transformer according to the present invention.

FIG. 1 shows a cross-sectional view of a bearing 1 with an integral transformer according to the present invention. The bearing 1 consists of an outer ring 2 and an inner ring 3 which are able to rotate relative to one another. The bearing 1 can, for example, be a sleeve bearing, but can also be a ball bearing or roller bearing. A first coil 4 is mounted on the outer ring 2 and a second coil 5 is mounted on the inner ring 3. The axes of the first and the second coil 4, 5 are preferably coincident with the axis of rotation 8 of the bearing 1. In one embodiment of the bearing the first and second coil 4, 5 are surrounded by respective first and second coverings 6, 7 in order to prevent dirt and lubricant gaining access to the first and the second coil 4, 5.

Figure 2:
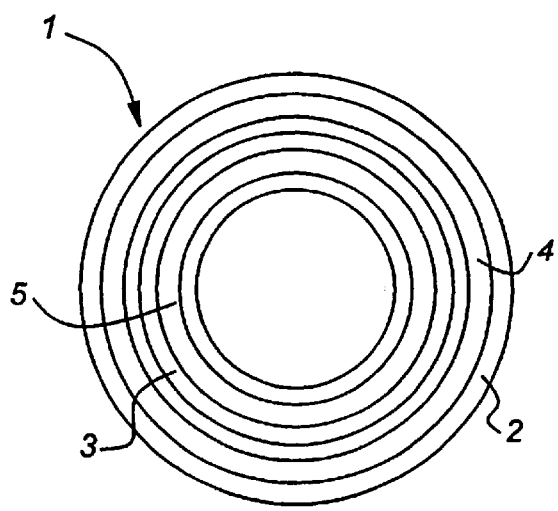
FIG. 2 shows a front view of the bearing in FIG. 1.

FIG. 2 shows a front view of the bearings in FIG. 1. In this figure it can clearly be seen that the mid points of the first and the second coil 4, 5 are coincident with the axis of rotation 8 of the bearing 1. The first and the second coil 4, 5 are preferably made up of a number of windings of conducting material, such as copper. The first and the second coil 4, 5 are as close as possible to one another, so that the magnetic flux generated by the one coil is also contained in the other coil. As a result of the mutual electromagnetic coupling of the first and the second coil 4, 5 it is possible to transmit electrical signals from the first coil 4 to the second coil 5 and vice versa. The mutual coupling of the first coil 4 and the second coil 5 is, as is known to those skilled in the art, dependent on the surface taken up by the two coils 4, 5 and the number of windings in each coil 4, 5. By choosing the dimensions and the number of windings correctly it is possible to achieve a strong electromagnetic coupling in a broad frequency range.

Figure 3:
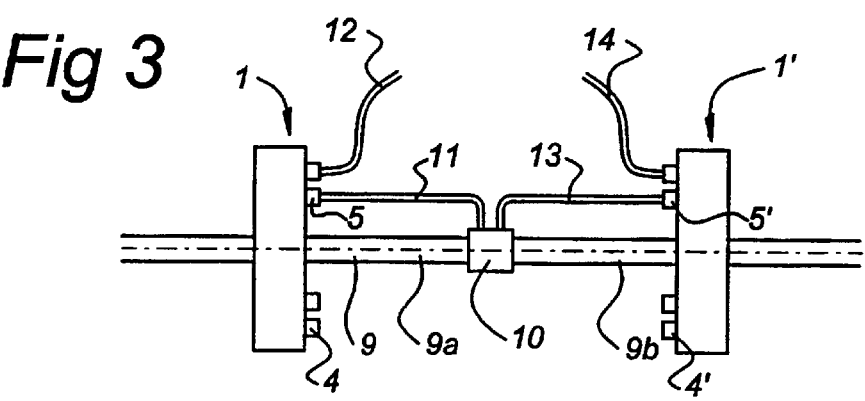
FIG. 3 shows a cross-sectional view of a bearing with an integral transformer according to a further embodiment of the present invention.

FIG. 3 shows a cross-sectional view of a bearing 1 with an integral transformer according to a further embodiment of the present invention. In this embodiment the first and the second part 2, 3 of the bearing 1 are made of a non-ferrous material. By this means it is possible to place the first coil 4 in a recess 15 in the first part 2 of the bearing and to embed the second coil 5 completely in the second part 3. It will be clear that both coils 4, 5 can be placed in a respective recess 15 or both coils can be completely embedded.

It is also possible to construct the first and/or second coil 4, 5 as printed windings on the first and second part 2, 3 of the bearing 1, respectively. An electronic circuit (not shown) connected to the first or second coil 4, 5 can also be provided on a part of the bearing 1, as a result of which an even more compact construction of the bearing 1 according to the invention is possible.

Figure 4:
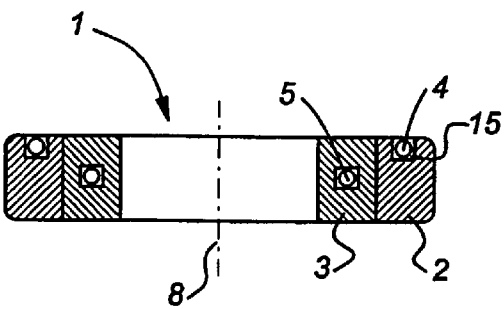
FIG. 4 shows an assembly of two bearings according to FIGS. 1 to 3 and a rotary shaft with a circuit fixed thereon.

FIG. 4 shows an assembly of two bearings 1, 1' with an integral transformer which support a rotary shaft 9 which consists of two parts 9a, 9b. The two bearings 1, 1' are identical in other respects, but for the sake of clarity of the description the relevant components of the one bearing 1' will be indicated by the same reference numerals as the other bearing 1, but with a prime. On the rotary shaft 9 there is a circuit 10 between the two shaft sections 9a, 9b, for example a measurement circuit 10 for measuring the torsion which occurs between the two shaft sections 9a, 9b. Torsion sensors of this type are known to those skilled in the art and require no further explanation here.

The measurement circuit 10 is connected to a signal line 11 and a power line 13. The other end of the power line 13 is connected to the second coil 5' of the one bearing 1' and the other end of the signal line 11 is connected to the second coil 5 of the other bearing 1.

Using this preferred embodiment of the assembly of at least one bearing 1 with an integral transformer and a rotary shaft 9 it is possible to make the measurement signals from the measurement circuit 10 available via signal line 11 and the second coil 5 on the rotary part of the other bearing 1, via the first coil 4 electromagnetically coupled thereto, by means of the stationary signal line 12.

Correspondingly, the measurement circuit 10 on the rotary shaft 9 can be provided with electric power via the stationary connection lines 14, which are connected to the first coil 4' on the non-rotary part of the one bearing 1'. The first coil 4' is electromagnetically coupled to the second coil 5', as a result of which the electrical power supply becomes available at the measurement circuit 10 via the power line 13.

It will be clear to a person skilled in the art that the signals from the measurement circuit 10 can consist of multiple measurement signals which have been multiplexed. A person skilled in the art will also understand that the signal path from the circuit 10 on the rotary shaft 9 to the stationary connection 12, 14 on the stationary part of the bearing 1, 1' is suitable for two directions. Therefore, with a few further facilities in the circuit 10, one line and therefore one bearing 1 according to the present invention suffices both to provide the circuit 10 with power and to make signals from the circuit 10 on the rotary shaft 9 available via the stationary signal line 12.

Figure 5A:
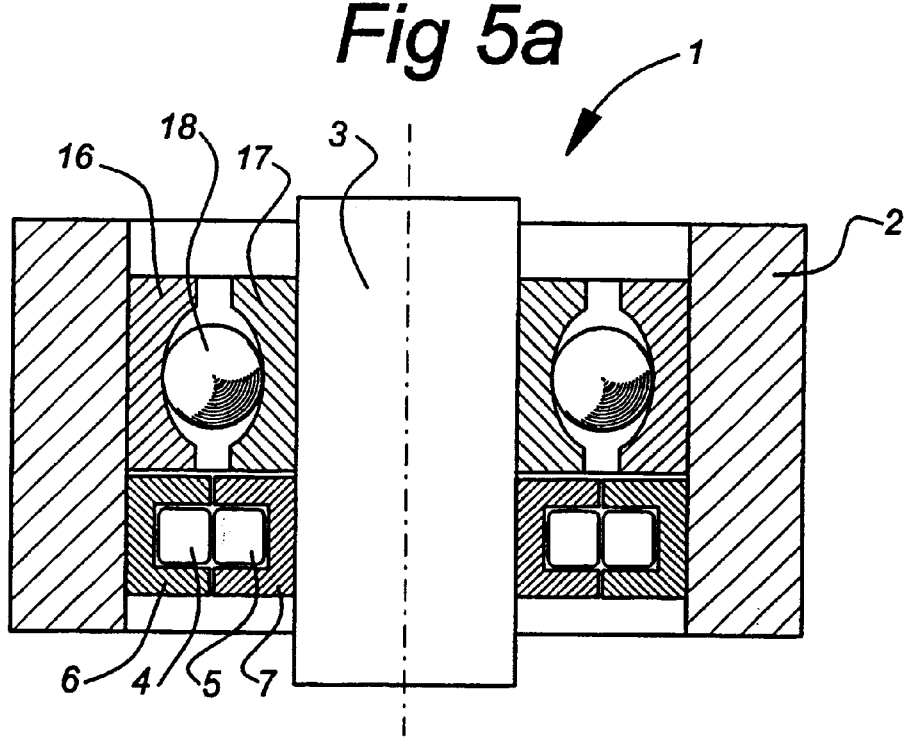
FIGS. 5a and 5b show cross-sectional views of two further embodiments of a bearing according to the present invention.
Figure 5B:
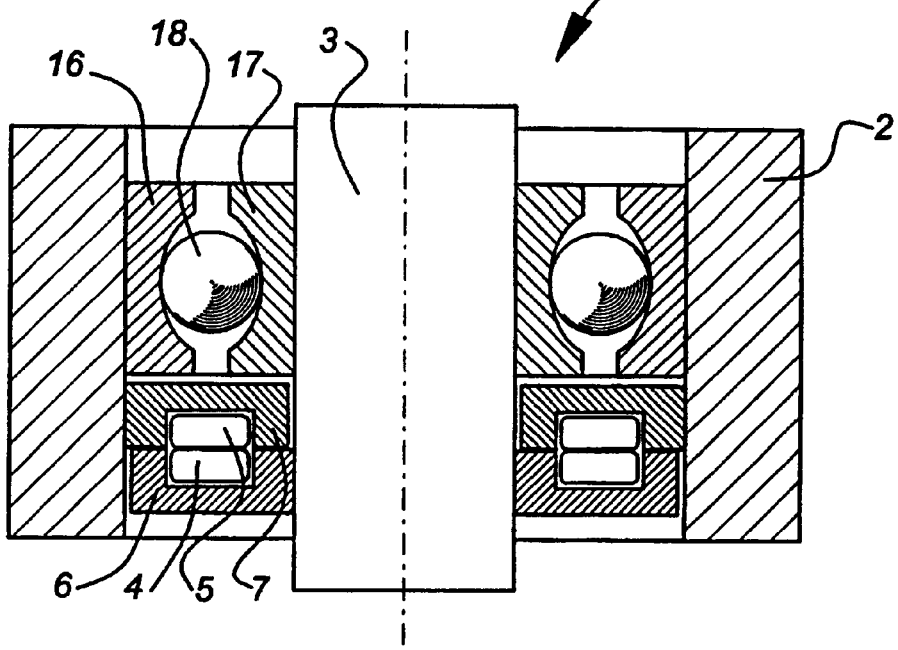

FIGS. 5a and 5b show cross-sectional views of a roller bearing 1 which comprises an outer ring 2, an inner ring or shaft 3, an outer ball bearing liner 16, an inner ball bearing liner 17 and a number of ball bearings 18. As a result of the presence of the ball bearings 18, the coils 4, 5 of the bearing according to the invention can be placed between the outer ring 2 and the inner ring 3. This leads to an even more compact construction of the bearing according to the present invention. It is indicated in FIG. 5a that the first coil 4 and the second coil 5 are positioned in the same axial position of the bearing, the radius of the first coil 4 being greater than the radius of the second coil 5. FIG. 5b shows an alternative positioning of the two coils. The radius of the first coil 4 is in this case identical to the radius of the second coil 5. The first and second coverings 6, 7 of the first and second coil 4, 5 respectively, are preferably constructed in the form of U-shaped sections of magnetically conducting material, the first covering 6 and second covering 7 being aligned such that the open ends face one another. By this means the first coil 4 and second coil 5 are magnetically enclosed, as a result of which the transmission of signals will be more effective.

In a further embodiment, the open ends of the first covering 6 and second covering 7 facing each other have a specific shape, such that the air gap between the open ends of the first and second covering 6, 7 varies when the first part 2 and second part 3 rotate with respect to each other. This air gap causes a change of the electromagnetic coupling and hence a variation of the signal coupled from the first coil 4 to the second coil 5. This variation is a signal indicating the relative rotational speed of the first part 2 and second part 3.

For the person skilled in the art, it will be apparent that the specific shape can be realized in various embodiments of the first and second covering 6, 7.

Figure 6:
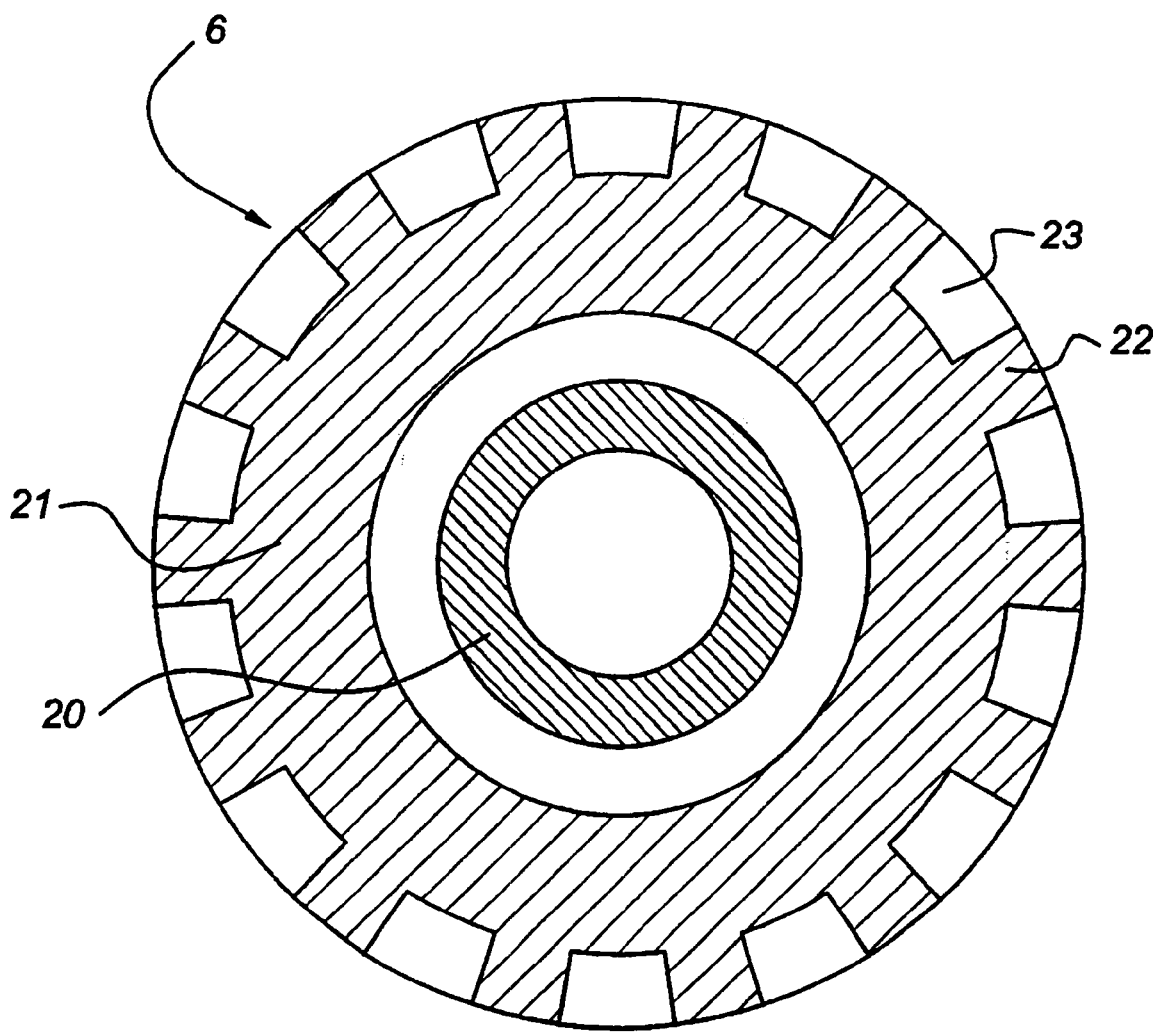
FIG. 6 shows a top view of a covering of FIG. 5b.

An example of a specific shape of the first covering 6 and second covering 7 having the desired effect is depicted in FIG. 6. FIG. 6 shows a top view of the first covering 6 as depicted in FIG. 5b, i.e. in the direction of the bearing axis. A first open end 20 and a second open end 21 are, in this case, formed by circular bodies. One of the open ends 20, 21 are provided with recesses 23 in the magnetically conductive material, leaving sprocket like extensions 22 in the second open end 21.

The second covering 7 (not depicted) may have the same shape as the first covering 6. In the bearing assembly as described above, the open ends of the first and second covering 6, 7 are coaxially aligned. When the first and second part 2, 3 rotate with respect to each other, the recesses 23 of the first covering 6 will align with the recesses 23 of the second covering 7 in a first instance and with the extensions 22 in a second instance. Thus, the effective coupling between the first coil 4 and the second coil 5, enclosed by the first and second covering 6, 7, and hence the signal transmitted from the first coil 4 to the second coil 5 changes with rotation of the bearing 1.

Although the specific shape is depicted as consisting of recesses 23 on the outside of the circular second open end 21, the recesses may also be provided at the inside of the circular second open end 21, or over the whole width of the circular second open end 21. The recesses 23 may also be provided on the first open end 20, or on both the first and second open end 20, 21.

Therefore, the bearing according to the present invention can be used to transfer energy and/or data from the rotating part to the static part of a bearing and vice versa, but also, a speed signal may be generated. The speed signal may be isolated from the energy signal or data signal in various manners known to the person skilled in the art.

What is claimed is:

1. A bearing, comprising: a first part provided with a first coil, a second part rotatable with respect to the first part about a bearing axis and being provided with a second coil which is electromagnetically coupled to the first coil, the first and second coil being magnetically enclosed by a first covering and a second covering, respectively, the first covering being fixed to the first part and the second covering being fixed to the second part, wherein at least one facing end of the first and second coverings is provided with at least one recession extending in an axial direction to define a variable air gap that varies when the first part and second part rotate with respect to each other to provide a change in electromagnetic coupling indicative of relative rotational speed of the first part and the second part.

2. The bearing according to claim 1, wherein axes of the first and second coil are coincident with the bearing axis.

3. The bearing according to claim 1, wherein the bearing is made of a non-ferrous material and at least one of the first and second coils is located in a recess in the first or second part, respectively.

4. The bearing according to claim 1, wherein the bearing is made of a non-ferrous material and at least one of the first and second coils is embedded in the first or second part, respectively.

5. The bearing according to claim 1, wherein at least one of the first and second coils comprises printed windings.

6. The bearing according to claim 1, wherein at least one of the first and second parts of the bearing is provided with an electronic circuit connected to the first or second coil, respectively.

7. The bearing according to claim 1, wherein the first and second coverings are formed by U-shaped circular members, the variable air gap being formed by at least one recession in one of the U-shaped circular member legs.

8. An assembly of at least one bearing according to claim 1 and a rotary shaft supported by the least one bearing, wherein the assembly is further provided with an electrical circuit which is fixed on the rotary shaft and has connections which are linked to the second coil.

9. The assembly according to claim 8, wherein signals originating from the circuit are fed to the second coil via a signal line.

10. The assembly according to claim 8, wherein the first coil is connected to an electrical power supply and the second coil is connected to the circuit via a power line.

11. The bearing according to claim 1, wherein the at least one recession is provided axially along the bearing axis.

12. A bearing, comprising: a first part provided with a first coil, a second part rotatable with respect to the first part about a bearing axis and being provided with a second coil which is electromagnetically coupled to the first coil, the first and second coil being magnetically enclosed by a first covering and a second covering, respectively, the first covering being fixed to the first part and the second covering being fixed to the second part, at least one air gap being formed between facing ends of the first and second coverings, wherein at least one of the facing ends of the first and second coverings is provided with at least one recession, such that the air gap varies when the first part and second part rotate with respect to each other, wherein the bearing is made of a non-ferrous material and at least one of the first and second coils is embedded in the first or second part, respectively.

13. A bearing, comprising: a first part provided with a first coil, a second part rotatable with respect to the first part about a bearing axis and being provided with a second coil which is electromagnetically coupled to the first coil, the first and second coil being magnetically enclosed by a first covering and a second covering, respectively, the first covering being fixed to the first part and the second covering being fixed to the second part, at least one air gap being formed between facing ends of the first and second coverings, wherein at least one of the facing ends of the first and second coverings is provided with at least one recession, such that the air gap varies when the first part and second part rotate with respect to each other, wherein at least one of the first and second coils comprises printed windings.

* * * * *